UNITED STATES PATENT OFFICE 2,420,269

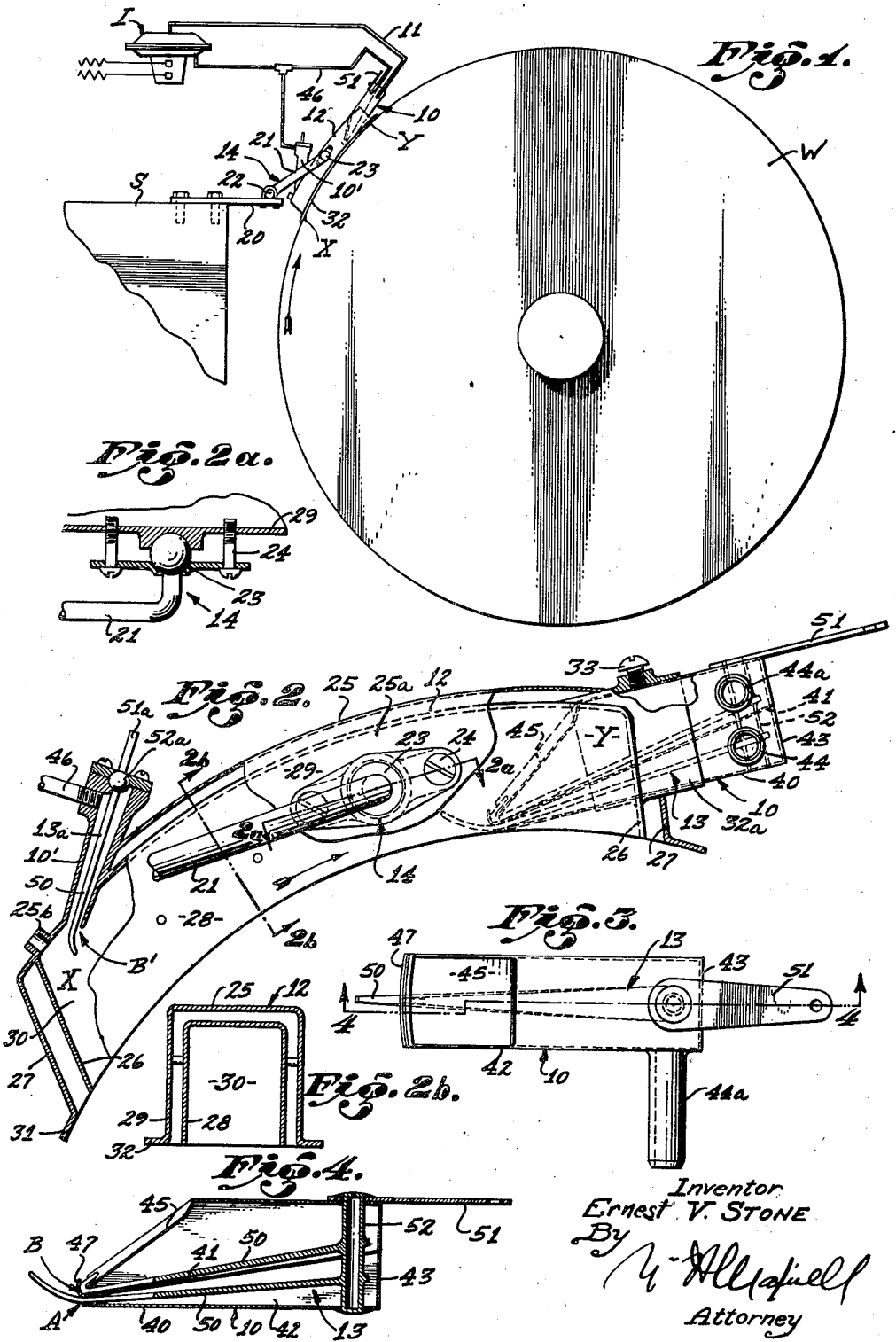

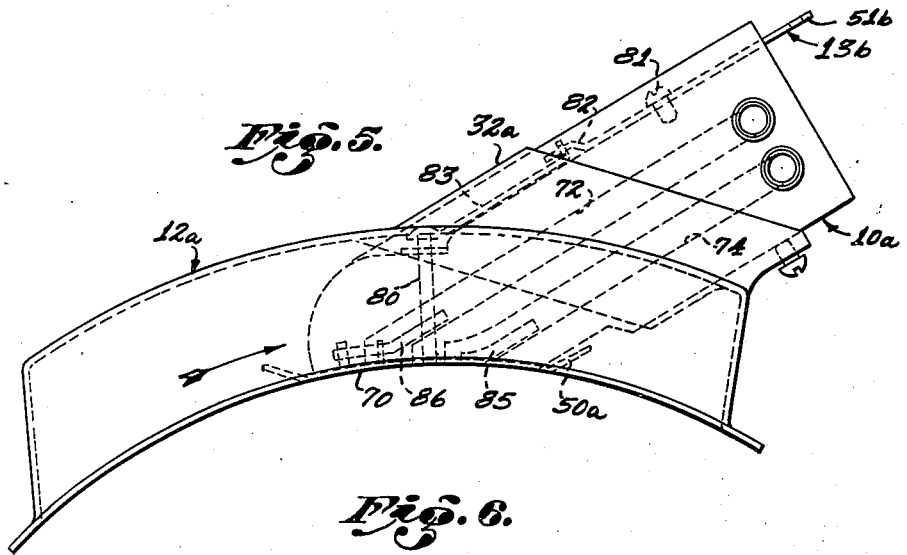
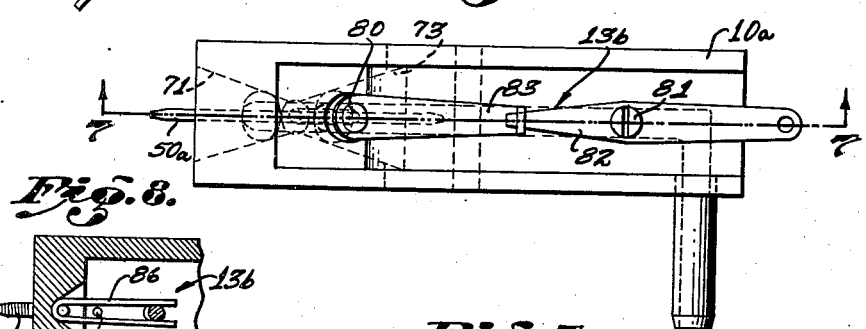
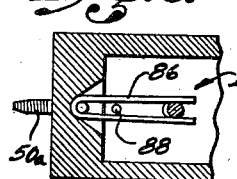
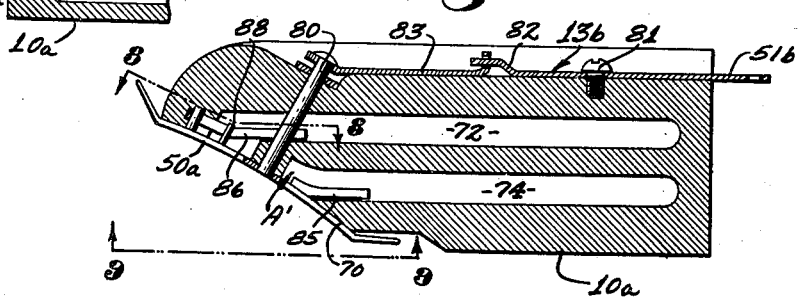
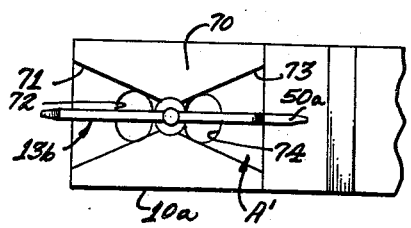

PNEUMATIC CONTROL

Ernest V. Stone, Los Alamitos, Calif.

Application September 11, 1944, Serial No. 553,610

14 Claims. (Cl. 230—1)

This invention has to do with a pneumatic control and it is a general object of the invention to provide a control or apparatus operable from or by means of circulation of air created by a flywheel or like revolving element. It is a general object of the present invention to provide a simple, effective and improved instrument or apparatus of the general character referred to. The apparatus provided by my present invention is of the general character of that which is the subject of Patent No. 2,160,318, entitled "Over speed engine control," issued to me on May 30, 1939. A general object of the present invention is to provide improvements in the general type of apparatus referred to in the said patent.

A revolving element such as a flywheel creates a circulation of air and this phenomena is most pronounced immediately adjacent the periphery of the wheel. It will be obvious, of course, that a revolving element provided with fans or blades will act with a rather high degree of efficiency in creating a circulation of air. However, when such means are employed the circulation of air that is obtained is not steady but has a marked tendency to pulsate or fluctuate, a characteristic which is not desirable in apparatus such as I am concerned with. When a member such as a flywheel has a plain smooth periphery, as the ordinary flywheel has, the circulation or flow of air created by the motion of the wheel may be said to be a flow created by surface or skin friction of the air in engagement with the wheel and this flow or circulation will be not only constant but will bear a definite relationship to the speed of rotation of the wheel. It is this phenomena or pneumatic action that I utilize through the apparatus of my invention.

In my issued patent above referred to I disclose an orifice device which I there term a nozzle adjacent the periphery of the wheel, so that the flow of air created by the wheel acts through such device on a diaphragm to operate a suitable mechanism which is under control of the diaphragm. It is to be noted that in my issued patent I utilize only positive pressure created by the circulation of air and I do not have a differential pressure apparatus. Further, it will be noted that the element receiving flow of air from the wheel is completely exposed to be directly influenced by flow or circulation of air from causes other than the rotation of the wheel. It is also to be noted that in my patent no provision whatever is made for the removal of dirt or foreign matter that in practice accumulates at the element which is located adjacent the wheel.

In practice positive pressure obtainable from a wheel is not always sufficient to carry out the action desired and it frequently occurs that air currents other than those created by rotation of the wheel strike the apparatus and create results or conditions which are not a direct result or function of the rotation of the wheel. The latter condition arises particularly where the apparatus is used outdoors and also occurs from time to time in connection with indoor installations when doors or windows are left open or when draft conditions occur. It also happens in actual practice that lint and fine foreign matter generally is carried in the air which is circulated by a fly wheel and since the instrument which picks up the flow is located adjacent the wheel such instrument will catch such foreign matter and will become more or less clogged so that its efficiency is impaired.

A general object of my present invention is to provide a pneumatic apparatus or more specifically an apparatus energized by the flow of air created by a flywheel and which utilizes a differential of pressure created by the flywheel or, in other words, both a positive and a negative pressure derived from the flow of air created by the wheel.

Another object of the present invention is to provide apparatus of the general character referred to including a shield or guard whereby the apparatus is protected against the influence of air currents or the circulation of air from sources other than the wheel.

Another object of the invention is to provide apparatus of the general character referred to with cleaning means operable to clean or free the essential parts of the apparatus of foreign matter such as accumulates from time to time under working conditions.

A further object of the present invention is to provide general improvements in the mounting and arrangement of parts in apparatus of the general character hereinabove referred to. By my present invention I provide a construction that can be applied to an ordinary engine flywheel so that the instrument or apparatus is arranged in the most advantageous position and in which the parts are separable or readily available for replacement or repair.

The various objects and features of my invention will be fully understood from the following detailed description of typical preferred forms and applications of the invention, throughout which description reference is made to the accompanying drawings, in which:

Fig. 1 is a general, more or less diagrammatic view showing the manner in which apparatus of the present invention is applicable to a flywheel such as the flywheel of an engine or the like. Fig. 2 is an enlarged side elevation of the essential parts of the apparatus of the present invention, certain portions being broken away to show in section. Fig. 2$^a$ is a detailed sectional view taken substantially as indicated by line 2$^a$—2$^a$ on Fig. 2. Fig. 2$^b$ is a section of the structure shown in Fig. 2 as it appears at line 2$^b$—2$^b$. Fig. 3 is a top plan view of one element of the invention showing it detached or removed from other parts of the apparatus. Fig. 4 is a longitudinal detailed sectional view of the parts shown in Fig. 3 being a view taken substantially as indicated by line 4—4 on Fig. 3. Fig. 5 is a view similar to Fig. 2 showing another form of construction embodying the invention. Fig. 6 is a view similar to Fig. 3 showing an element embodied in the device of Fig. 5 separate from the other parts of the apparatus. Fig. 7 is a longitudinal sectional view of the parts shown in Fig. 6 being a view taken as indicated by line 7—7 on Fig. 6. Fig. 8 is a detailed sectional view taken as indicated by line 8—8 on Fig. 7, and Fig. 9 is a view taken as indicated by line 9—9 on Fig. 7.

The apparatus provided by my invention is to be used in conjunction with a revolving element such as a flywheel W which may, for purpose of example, be considered as the flywheel of an engine. The apparatus of the present invention will respond to variations in air movements created by the wheel so that it is sensitive to variations in speed of the wheel. The apparatus of the present invention is used in connection with or is coupled to an instrument I which may be such as to act or respond in any desired manner, for instance either to signal or possibly to control a governor for the engine driving the wheel, or to perform any other desired function. For purpose of example it may be considered that the instrument I controls a governor for the engine which drives the wheel, in which case the apparatus may be said to be part of a speed control.

A typical unit or embodiment of the present invention involves, generally, an inlet orifice A established by a body 10 which forms an air duct, a tubular conduit 11 connecting the body with the instrument I, a shield 12 for the orifice forming portion of the body 10 and means 13 operable to clean the body at the orifice. The structure that I have provided also includes means 14 for mounting the shield 12. In the preferred arrangement shown in the drawings the mounting means 14 supports the shield 12 from a fixed support S and the shield in turn carries the body or bodies which establish the orifices. In the preferred form of the invention I provide, in addition to an inlet orifice A, a second or outlet orifice B which may also be established by the body 10. In addition to the outlet orifice B I may provide a supplemental outlet orifice B' established by a supplemental body 10I supported by the shield 12 at a point spaced from the body 10 which establishes the orifice A. In carrying out the invention the bodies 10 and 10' may be fixed or even formed integral with the shield 12. However, in practice I prefer to form the body 10 as a unit or part detachable from the shield and it is thus shown in the drawings. I have, however, shown the body 10' as formed integral with the shield. In carrying out my invention the shield 12 is mounted immediately adjacent the periphery of the wheel W. In fact, it is usually desirable to mount the shield so that it fits the periphery of the flywheel with about .008 of an inch clearance. The shield may be mounted in any position around the flywheel. However, in most instances I locate it above the center of the wheel so that any moisture that may be trapped in or which might accumulate in it for any reason will readily drain and not be trapped. In Fig. 1 I show a typical arrangement or installation.

The mounting means 14 may, in practice, be varied to fit or suit conditions that are encountered. In the particular arrangement illustrated the mounting means includes a bracket 20 fixed to the support S, an arm 21, a pivot pin 22 pivotally connecting the inner end of the arm to the bracket 20, and a ball and socket connection 23 connecting the outer end of the arm to the shield 12. The pivot pin 22 is arranged so that its axis is parallel with that of the wheel so that the arm can be moved to adjust the shield 12 bodily to and from the face of the wheel without changing its angularity relative to the axis of the wheel. The universal or ball connection 23 between the outer end of the mounting arm 22 and the shield 12 allows the shield to be shifted in any direction to bring it into the desired position relative to the wheel. It will be noted that this ball and socket connection includes screws 24 which can be operated to clamp the connection so that it is tight and thus holds the shield 12 firmly in the desired adjusted position.

The shield 12 which serves to protect the orifice or orifices of the apparatus from outside disturbances is a box-like housing shaped to conform to the contour of the periphery of the wheel W and open at the side which faces the wheel. The housing in its preferred form is an elongate structure curved concentric with the axis of the wheel so that it can be arranged to follow the contour of the wheel as shown in Fig. 1 of the drawings. The particular housing illustrated in the drawings involves an outer wall 25 curved concentric with the wheel and also side walls and end walls which join the outer wall and project inwardly therefrom toward the periphery of the wheel. I may, in practice, provide a single outer wall, a single end wall at each end of the outer wall and a single side wall at each side edge of the outer wall. However, I have found it most advantageous to provide a plurality of end walls at each end of the body and a plurality of side walls at each side of the body and double or spaced outer walls. In the particular case illustrated I have shown two end walls at each end of the body, an inner end wall 26 and an outer end wall 27 and at each side of the body I have shown an inner side wall 28 and an outer side wall 29. Further, I have shown a second or outside outer wall 25$^a$. The end walls and side walls of the shield project inwardly or toward the periphery of the wheel and terminate so that when the shield is properly adjusted they are all equidistant from the wheel. The end walls and side walls are spaced apart or are unjoined adjacent the wheel forming what may be termed an air trap which checks or materially dampens any flow of air into the cavity 30 formed by the shield. In the arrangement illustrated flanges 31 and 32 project outwardly from the outer ends 27 and the outer sides 29 to follow the contour of the wheel, thus further obstructing the flow of air into the shield. In practice I provide the shield with a drain hole 25$^b$ to drain moisture from it when the shield is positioned so it tends to catch or hold moisture.

With the general structural formation of the shield above described and when the shield is mounted, as shown in Fig. 1, the air in the cavity 30 established by the shield is effectively insulated or isolated from outside air, insofar as air movements are concerned, and as the wheel revolves in the direction indicated by the arrow in Fig. 1 flow of air will be set up in the air in the cavity 30 in the direction indicated by the arrow in Fig. 2, so that there is a differential of pressure between the two ends of the cavity, there being a somewhat reduced pressure at what I will term the forward end X, as distinguished from the rear end Y.

The body 10 which is formed to establish the orifice A and also the orifice B if the orifice B is employed, is supported by the shield 12 so that the orifice A and the orifice B, if there is one, are located at or in the rear end portion of the cavity 30 in the shield. When the body 10 is detachable from the shield as I have shown in the drawings I provide an opening in the rear end portion of the shield to slidably receive the body. In the preferred construction illustrated the opening is established by a sleeve-like part 32ª projecting from the rear end portion of the body and communicating with the cavity 30 of the body. The sleeve carries a set screw 33 which can be operated to engage the body to hold it in the desired adjusted position.

The body 10 involves, generally, longitudinal inner and outer walls 40 and 41, respectively, which converge toward the forward end of the body where they are spaced apart to define the orifice A. The walls 40 and 41 are joined by side walls 42 and by a rear wall 43. As a result of the arrangement just described the body forms or establishes the orifice A at its forward end and forms an air duct continuing rearward from the orifice to the rear end of the body. A fitting 44 connects to the rear portion of the duct thus formed by the body to receive or for making connection with the conduit 11 which extends to the instrument I.

The sleeve-like portion 32ª of the shield which slidably supports the body is angularly disposed so that as the body is moved inwardly through it its forward end or orifice A approaches the periphery of the wheel W. In practice the body 10 is adjusted or moved inwardly to bring the orifice A into the desired position relative to the face of the wheel.

When it is desired to provide an outlet orifice B in immediate conjunction with the orifice A the body is provided with what I will term a top wall 45 spaced above the wall 41 and related to the wall 41 so that they converge toward the forward end of the body where they are spaced apart defining the orifice B. The side walls 42 of the body are extended to close between the walls 41 and 45 and the rear wall 43 is extended to close the rear of the passage formed by the walls 41 and 45. A fitting 44ª is provided in communication with the passage or duct thus formed between the walls 41 and 45 to receive or connect with a conduit 46 that can be extended to the instrument I. When the body is provided with the wall 45 the forward end of the wall 41 is extended and turned upwardly to form an upwardly or outwardly turned lip 47 which shields the orifice B and serves to deflect the flow of air past the orifice B or immediately above the orifice B so that it creates a reduced pressure or suction at the orifice B. Through this arrangement or construction I provide at the forward end of the body 10 the two orifices A and B, one of which, the orifice A, receives the flow of air created by the wheel so that a positive pressure builds up in the body between the walls 40 and 41 while a negative or reduced pressure is established between the walls 41 and 45. The differential of pressure thus established in the body 10 is communicated to the instrument I through the conduits 11 and 46 where it may be applied to opposite sides of a diaphragm or the like to effectively actuate the instrument. In the drawings I have indicated a diaphragm type of instrument I utilizing the differential of pressure created in the body 10 in the manner just described.

As I have pointed out above, I do not, in all cases, need to utilize the outlet or negative pressure orifice B but may rely entirely upon positive pressure obtained through orifice A. Further, in carrying out my invention I may, instead of using the orifice B above described to get action obtained through the orifice B, use a supplemental body 10' with a supplemental orifice B' located at the forward end portion of the shield or at the region X, where there is generally a reduced pressure within the cavity of the body. In Figs. 1 and 2 of the drawings I have shown a supplemental body 10' at the forward end portion of the shield establishing an orifice B' in the forward end of the cavity 30, but well removed from the periphery of the wheel, so that the reduced pressure of the portion X of space 30 is communicated into the body 10' which pressure is communicated through a supplemental conduit 46' to the instrument I. As I have stated above, the supplemental negative pressure means just described may be used in conjunction with the orifice B or in place of the orifice B, as circumstances may require.

The means 13 shown in Figs. 2, 3 and 4 for cleaning the orifices of the body 10 includes, generally, a wiper 50 projecting forward through the body to extend out through each orifice, an operating arm 51, and a suitable connection between the arm and the wipers. In the case illustrated a shaft 52 is rotatably supported by the body. The arm 51 is mounted on the shaft at the exterior of the body while the wipers 50 are mounted on the arm inside the body. It is to be understood that the wipers are proportioned so that they are considerably narrower than the orifices in which they operate and so that they can be shaped and proportioned so that they effectively wipe foreign matter that tends to accumulate in the orifices. In practice, the operating arm 51 by projecting from the exterior and rear end portion of the body, is accessible so that it can be conveniently operated occasionally and thus keep the orifices free and in proper operating condition.

In the form of cleaning means 13ª shown at the body 10' the wiper 50 projects through the body to the orifice B'. In this case a ball 52ª is supported at the outer portion of the body 10' and the wiper 50 projects inwardly from the ball while the operating arm 51 projects outwardly from the ball.

In the form of the invention shown in Figs. 5 to 9, inclusive, the shield 12ª may be essentially the same as the shield above described except that the sleeve portion 32ª is arranged to support the body 10ª in a position somewhat forward of that hereinabove described. The reason for this change in position is that in the form of body illustrated in these figures of the drawings a reduced pressure is established at the orifice A' by reason of flow of air past the forward or tip portion of the body, as above described. The body shown in Figs. 5 to 9, inclusive, is in the form of a block of material having a forward end face 70 of considerable extent which fits rather closely to the face of the wheel W. At the forward end of the face 70 there is a recess 71 which admits air circulated by the wheel into what I will term the high pressure port or passage 72 in the body. At the rear edge portion of the face 70 there is a recess 73 which extends forward in the face and communicates with what I will term a low pressure port or passage 74. As this form of the invention operates air circulated in the direction indicated by the arrow in Fig. 5 by reason of the motion of the wheel enters the recess 71 to create a positive pressure in the passage 72. This flow of air moves past the forward end portion of the body 10ª and in moving past the rear portion of the surface 70 creates a reduced pressure in the recess 73 so that a reduced pressure condition is established in the passage 74. The ports or passages 72 and 74 may be connected to opposite sides of a diaphragm or the like of instrument I through conduits, as explained in the form of the invention first described.

The cleaning means 13ᵇ in the form of the invention shown in Figs. 5 to 9, inclusive, involves wipers 50ª carried on a pivoted shaft 80 to operate in the recesses 71 and 73. The operating arm 51ᵇ is carried on a pivot pin 81. The arm 51ᵇ and the shaft 80 are connected by coupled arms 82 and 83 so that when the operating arm 51ᵇ is swung or operated the shaft 80 will be correspondingly moved causing the wipers 50ª to be moved through or across the recesses 71 and 73. In this form of the invention I have found it desirable to provide supplemental wipers 85 and 86 in the passages 74 and 72, respectively. The wiper 85 is attached to the wiper that operates through recess 73 while the wiper 86 is independently mounted in the entrance of passage 72 and is operated by means of a suitable projection 88 on the wiper 50ª which operates in recess 71. When the wipers 50ª operate through the recesses 71 and 73 the supplemental wipers 85 and 86 operate in the forward portions of the passages 74 and 72, thus keeping the essential parts of the apparatus free of foreign matter.

From the foregoing description it will be apparent that I have provided apparatus which utilizes flow or circulation of air created by a wheel so that that flow or action is used most advantageously to operate an instrument such as an instrument I. By my invention I not only utilize positive pressure created by such flow, but I develop a negative pressure from the flow so that I have both a positive and negative pressure and use the differential between the two. Further, it will be apparent from the foregoing description that I have provided a shielded construction which is entirely free of outside disturbances making the apparatus accurate and dependable even though it is used on a wheel located out of doors where it may be exposed to wind or weather.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. In combination, a fly wheel revolving about a fixed axis and having its rim exposed, a body mounted stationary adjacent and radially outward of the wheel and having an open orifice arranged to receive flow of air from the rim of the wheel, a conduit in communication with the orifice, and a shield forming a cavity facing the wheel in which cavity the body is arranged, the shield having walls formed of spaced members closely approaching the wheel.

2. In combination, a fly wheel revolving about a fixed axis and having its rim exposed, a shield arranged radially outward of the wheel to extend in the direction of the periphery of the wheel and in close proximity thereto, a body in the shield having an orifice facing into the flow of air created by the wheel, and a conduit in communication with the orifice.

3. In combination, a fly wheel revolving about a fixed axis and having its rim exposed, a shield mounted stationary adjacent the periphery of the wheel to extend in the direction of the periphery of the wheel and in close proximity thereto, a body in the shield having an orifice at the end portion of the shield where the wheel leaves the shield and facing into the flow of air created by the wheel, and a conduit in communication with the orifice.

4. In combination, a fly wheel revolving about a fixed axis and having its rim exposed, a shield, means mounting the shield at the periphery of the wheel establishing a cavity immediately adjacent the periphery of the wheel, a body having an orifice, a conduit in communication with the orifice, and means whereby the body is supported by the shield with the orifice in the cavity facing into the flow of air created by the wheel.

5. In combination, a fly wheel revolving about a fixed axis and having its rim exposed, a shield mounted stationary adjacent the wheel forming a cavity facing the wheel, a body having an orifice, a conduit in communication with the orifice, and means whereby the body is supported by the shield with the orifice in the cavity facing into the flow of air created by the wheel and shiftable to vary the spacing of the orifice relative to the periphery of the wheel.

6. In combination, a fly wheel revolving about a fixed axis and having its rim exposed, a body mounted stationary adjacent the wheel and having an orifice receiving flow of air from the wheel, a conduit in communication with the orifice, a shield at the orifice protecting it against other flow of air, and means operable to clean the orifice.

7. In combination, a fly wheel revolving about a fixed axis and having its rim exposed, a body mounted stationary adjacent the wheel and having an orifice faced to receive flow of air from the wheel, a conduit in communication with the orifice, and means operable to clean the orifice.

8. In combination, a fly wheel revolving about a fixed axis and having its rim exposed, a body mounted stationary adjacent the wheel and having an orifice receiving flow of air from the wheel, a conduit in communication with the orifice, and means operable to clean the orifice including a wiper at the orifice and an operating member connected with the wiper and moving it.

9. In combination, a fly wheel revolving about a fixed axis and having its rim exposed, a shield arranged to form a cavity adjacent the rim of the wheel, means establishing two orifices in the cavity, one disposed at one end of the cavity so flow of air in the cavity created by the wheel develops a positive pressure and the other disposed at the other end of the cavity so such flow develops a negative pressure and conduits in communication with the orifices.

10. In combination, a fly wheel revolving about a fixed axis and having its rim exposed, a body having an orifice arranged to receive flow of air from the wheel, a conduit in communication with the orifice, a shield at the orifice protecting it against other flow of air, and universal mounting means for the shield.

11. In combination, a fly wheel revolving about a fixed axis and having its rim exposed, a body having an orifice open to flow of air from the periphery of the wheel, and a shield at the orifice protecting it against other flow of air, the shield being in the form of a housing and having a drain opening.

12. In combination, an exposed flywheel revolving about a fixed axis, a body mounted stationary adjacent the outer surface of the periphery of the wheel to extend only partially around the wheel and having an orifice open to flow of air from the wheel, a conduit in communication with the orifice, and a shield at the orifice protecting it against other flow of air.

13. In combination, a flywheel revolving about a fixed axis, a shield mounted stationary adjacent the wheel to extend only partially around the wheel in the direction of the periphery of the wheel and in close proximity thereto, a body in the shield having an orifice facing into the flow of air created by the wheel, and a conduit in communication with the orifice.

14. In combination, a wheel revolving about a fixed axis, a shield mounted stationary adjacent the wheel forming a cavity facing the wheel, a body having an orifice, a conduit in communication with the orifice and means whereby the body is supported by the shield with the orifice in the cavity facing into the flow of air created by the wheel and shiftable to vary the spacing of the orifice relative to the periphery of the wheel.

ERNEST V. STONE.

REFERENCES CITED

The following references are of record in the file of this patent:

UNITED STATES PATENTS

| Number | Name | Date |
| --- | --- | --- |
| 353,567 | Sears | Nov. 30, 1886 |
| 2,160,318 | Stone | May 30, 1939 |
| 1,640,526 | Bragg | Aug. 30, 1927 |
| 2,095,833 | Rockwell | Oct. 12, 1937 |
| 211,347 | De Romilly | Jan. 14, 1879 |
| 1,083,610 | Guy | Jan. 6, 1914 |
| 1,351,538 | Reynolds | Aug. 31, 1920 |

FOREIGN PATENTS

| Number | Country | Date |
| --- | --- | --- |
| 603,418 | German | Oct. 1, 1934 |